(12) United States Patent
Bartel et al.

(10) Patent No.: US 8,747,517 B2
(45) Date of Patent: Jun. 10, 2014

(54) METHODS FOR ISOLATING AND PURIFYING NANOPARTICLES FROM A COMPLEX MEDIUM

(75) Inventors: Joseph Bartel, Eugene, OR (US); Kari Haley, Eugene, OR (US); Berhane Measho, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 505 days.

(21) Appl. No.: 12/999,624

(22) PCT Filed: Jun. 30, 2009

(86) PCT No.: PCT/US2009/049304
§ 371 (c)(1),
(2), (4) Date: Mar. 11, 2011

(87) PCT Pub. No.: WO2010/002922
PCT Pub. Date: Jan. 7, 2010

(65) Prior Publication Data
US 2011/0155969 A1   Jun. 30, 2011

Related U.S. Application Data

(60) Provisional application No. 61/076,910, filed on Jun. 30, 2008, provisional application No. 61/076,833, filed on Jun. 30, 2008.

(51) Int. Cl.
*B22F 1/00* (2006.01)
(52) U.S. Cl.
USPC .................. 75/343; 252/301.36; 252/519.4; 313/503; 556/405

(58) Field of Classification Search
USPC ............... 252/301.36, 519.4, 301.4; 313/503; 977/774; 556/405; 75/343
See application file for complete search history.

(56) References Cited

U.S. PATENT DOCUMENTS

| | | | |
|---|---|---|---|
| 5,505,928 A | 4/1996 | Alivisatos et al. |
| 5,990,479 A | 11/1999 | Weiss et al. |
| 6,114,038 A | 9/2000 | Castro et al. |
| 6,207,229 B1 | 3/2001 | Bawendi et al. |
| 6,207,392 B1 | 3/2001 | Weiss et al. |
| 6,251,303 B1 | 6/2001 | Bawendi et al. |
| 6,274,323 B1 | 8/2001 | Bruchez et al. |
| 6,306,610 B1 | 10/2001 | Bawendi et al. |

(Continued)

FOREIGN PATENT DOCUMENTS

| | | |
|---|---|---|
| DE | 102004035803 | 3/2005 |
| WO | WO 2010/002922 | 1/2010 |

OTHER PUBLICATIONS

Talapin, D., et al. "Etching of colloidal InP Nanocrystals with Fluorides: Photochemical Nature of the Process Resulting in High Photoluminescence Efficiency", *J. Phys. Chem. B* 106: 2002, p. 12659-12663.
Dabbousi et al., *J. Phys. Chem. B* 101(46):9463-9475 (1997).

(Continued)

*Primary Examiner* — Khanh Tuan Nguyen
(74) *Attorney, Agent, or Firm* — Life Technologies Corporation

(57) ABSTRACT

A method for isolating a nanoparticle is disclosed. A medium containing a nanoparticle is provided. The medium is acidified with a weak acid. An alcoholic solvent is added to induce the nanoparticle to precipitate from the medium. The precipitated nanoparticles are separated from the medium.

20 Claims, 1 Drawing Sheet

(56) References Cited

U.S. PATENT DOCUMENTS

| | | |
|---|---|---|
| 6,319,426 B1 | 11/2001 | Bawendi et al. |
| 6,322,901 B1 | 11/2001 | Bawendi et al. |
| 6,326,144 B1 | 12/2001 | Bawendi et al. |
| 6,423,551 B1 | 7/2002 | Weiss et al. |
| 6,426,513 B1 | 7/2002 | Bawendi et al. |
| 6,444,143 B2 | 9/2002 | Bawendi et al. |
| 6,500,622 B2 | 12/2002 | Bruchez, Jr. et al. |
| 6,548,168 B1 | 4/2003 | Mulvaney et al. |
| 6,576,291 B2 | 6/2003 | Bawendi et al. |
| 6,649,138 B2 | 11/2003 | Adams et al. |
| 6,699,723 B1 | 3/2004 | Weiss et al. |
| 6,815,064 B2 | 11/2004 | Treadway et al. |
| 6,819,692 B2 | 11/2004 | Klimov et al. |
| 6,821,337 B2 | 11/2004 | Bawendi et al. |
| 6,869,545 B2 | 3/2005 | Peng et al. |
| 6,872,249 B2 | 3/2005 | Peng et al. |
| 6,921,496 B2 | 7/2005 | Anderson et al. |
| 7,068,898 B2 | 6/2006 | Buretea et al. |
| 7,079,241 B2 | 7/2006 | Empedocles et al. |
| 7,108,915 B2 | 9/2006 | Adams et al. |
| 7,138,098 B2 | 11/2006 | Bawendi et al. |
| 7,250,499 B2 | 7/2007 | Mirkin et al. |
| 7,575,621 B2 | 8/2009 | Vanheusden et al. |
| 7,744,834 B2 | 6/2010 | Lee et al. |
| 2004/0110220 A1 | 6/2004 | Mirkin et al. |
| 2005/0271593 A1 | 12/2005 | Yeh et al. |
| 2006/0054863 A1* | 3/2006 | Dai et al. ............... 252/301.4 R |
| 2006/0172133 A1 | 8/2006 | Naasani |
| 2008/0045736 A1* | 2/2008 | Ying et al. .................... 556/405 |

OTHER PUBLICATIONS

Hines et al., *J. Phys. Chem.* 100(2):468-471 (1996).
Murray et al., *J. Am. Chem. Soc.* 115(19):8706-8715 (1993).
Peng et al., *J. Am. Chem. Soc.* 119(30):7019-7029 (1997).
Talapin, et al., "Etching of colloidal InP Nanocrystals with Fluorides: Photochemical Nature of the Process Resulting in High Photoluminescence Efficiency", *J. Phys. Chem. B*, vol. 106; XP002640466, Nov. 14, 2002, 12659-12663.

* cited by examiner

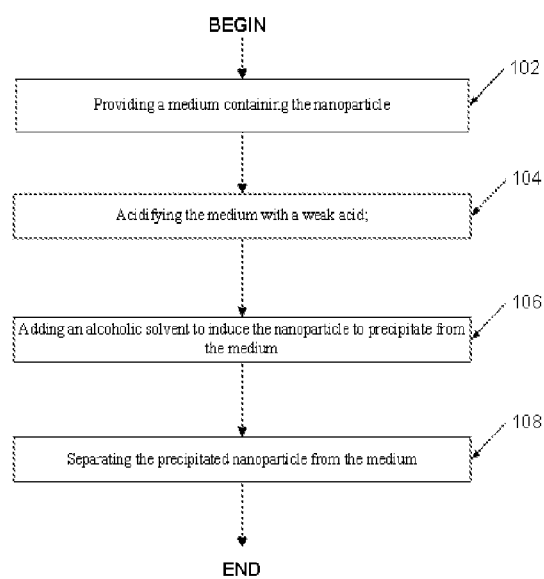

US 8,747,517 B2

METHODS FOR ISOLATING AND PURIFYING NANOPARTICLES FROM A COMPLEX MEDIUM

CROSS REFERENCE TO RELATED APPLICATIONS

This application is a national phase application under 35 U.S.C. §371 of International Patent Application No. PCT/US2009/049304, filed Jun. 30, 2009, which claims priority to U.S. Provisional Application No. 61/076,910, filed Jun. 30, 2008, and U.S. Provisional Application No. 61/076,833, filed Jun. 30, 2008, the disclosures of which are hereby incorporated by reference in their entireties.

TECHNICAL FIELD

The embodiments described herein relate to methods for isolating or purifying a nanoparticle from a complex mixture of materials. The methods use an acid and/or an alcoholic solvent to promote precipitation or solidification of the nanoparticle to make it easier to physically separate the nanoparticle from the other components of the mixture.

BACKGROUND

With the rapid recent growth of nanotechnology, convenient methods for the preparation, purification, isolation, modification, and other manipulations of nanoparticles are needed, particularly methods that are suitable for use to produce commercial quantities of nanoparticles of high purity and quality. For example, semiconductor nanocrystals are prepared in growth media containing a wide array of chemicals, including high-boiling solvents, alkylamines, alkyl phosphines, organic acids, phosphine oxides, phosphonic acids, and various salts, from which the nanocrystals must be isolated. After they are made, these nanocrystals are often treated with still more chemicals to modify their surface characteristics. For example, a semiconductor nanocrystal often is capped with a 'shell' that improves its optical characteristics, enhances its chemical stability, and optimizes other physical properties such as hydrophobicity, polarity, and solubility. In some cases, the shell makes the surface amenable to specific modifications that facilitate conjugation of the nanocrystal to another chemical species such as an antibody that can selectively deliver the conjugated nanocrystal to a particular type of receptor or cell.

That is, for many applications, nanoparticles must have certain types of functional groups on their surfaces to cause them to interact with or to become attached to a target molecule, particle, cell, or tissue. Methods for attaching suitable functional groups on the surfaces of nanoparticles are known in the art. However, for optimal performance and for many uses that demand highly consistent nanoparticles, there remains a need for methods to enhance the consistency of nanocrystal surface chemistry. For example, even if the nanocrystals in a batch are consistent in size, i.e., their size distribution is narrow enough to keep their optical properties consistent across a batch of nanocrystals, variations in surface chemistry may affect how well the nanocrystals perform in situations where impurities on the surface could be directly detrimental (e.g., for in vivo use, they could introduce toxicity concerns or promote problematic immunogenic responses) or indirectly detrimental (such as by interfering with efficient interactions with a target, or causing interactions to occur with non-target molecules, cells or tissues.) Particularly in applications where a single nanocrystal will be tracked, or where size differences that may be caused by differences in surface chemistry are important (e.g., where a nanoparticle is being observed via a FRET interaction that may make distance between the nanoparticle core and another absorber particularly important), having a highly uniform and very pure surface coating can be particularly important.

Such nanoparticles are made or modified using methods requiring complex reaction media. Frequently, nanocrystals such as quantum dots are made and/or modified while they are dissolved or suspended in a medium that contains high-boiling solvents, alkyl amines, alkyl phosphines, carboxylic acids, phosphonic acids, and other chemicals. This wide array of chemicals makes purification of the nanoparticle products challenging, particularly when the nanoparticles are to be used in applications where trace impurities carried with or adsorbed on the nanoparticles may interfere. Methods for the isolation and of nanoparticles from such complex media are needed that are quick and efficient, and that deliver a high yield of desired nanocrystal product with few or no deleterious impurities or contaminants.

Fluorescence-based analyses and nonisotopic detection systems have become a powerful tool for scientific research and clinical diagnostics for the detection of biomolecules using various assays including, but not limited to, flow cytometry, nucleic acid hybridization, DNA sequencing, nucleic acid amplification, immunoassays, histochemistry, and functional assays involving living cells. Fluorescent semiconductor nanocrystals have found widespread use due to their high fluorescent intensity and the ability of different nanocrystals to be excited by a single light source.

Peng et al. U.S. Pat. No. 6,872,249 disclose the synthesis of colloidal nanocrystals. A method of synthesizing colloidal nanocrystals is disclosed using metal oxides or metal salts as a precursor. The metal oxides or metal salts are combined with a ligand and then heated in combination with a coordinating solvent.

Peng et al. U.S. Pat. No. 6,869,545 discloses colloidal nanocrystals with high photoluminescence quantum yields and methods of preparing the same. The disclosure provides compositions containing colloidal nanocrystals with high photoluminescence quantum yields, synthetic methods for the preparation of highly luminescent colloidal nanocrystals, as well as methods to control the photoluminescent properties of these colloidal nanocrystals.

Bawendi et al. in U.S. Pat. No. 6,306,610 disclose quantum dot white and colored light emitting diodes (LEDs). The disclosure describes an electronic device comprising a population of quantum dots embedded in a host matrix and a primary light source which causes the dots to emit secondary light of a selected color, and a method of making such a device. The size distribution of the quantum dots is chosen to allow light of a particular color to be emitted from the structure. The dots can be composed of an undoped semiconductor such as CdSe, and may optionally be overcoated to increase photoluminescence. The host matrix for the device includes isolated dots within the matrix and not defined aggregates of nanocrystals.

U.S. Pub. No. 20040110220 to Mirkin et al. discloses nanoparticles having oligonucleotides attached to them and uses for such coated nanoparticles. The disclosure provides methods of detecting a nucleic acid that comprise contacting the nucleic acid with one or more types of nanoparticles having oligonucleotides attached to them. The disclosure describes a method where oligonucleotides are attached to nanoparticles and have sequences complementary to portions of the sequence of the nucleic acid. A detectable change is brought about as a result of the hybridization of the oligonucleotides on the nanoparticles to the nucleic acid. The disclosure describes methods of synthesizing nanoparticle-oligonucleotide conjugates and methods of using the conjugates. The disclosure describes nanomaterials and nanostructures comprising nanoparticles and methods of nanofabrication utilizing nanoparticles. The disclosure describes a method of separating a selected nucleic acid from other nucleic acids.

Nanocrystals are typically separated from their growth/preparation medium by the addition of polar solvents such as methanol. This method is often used where the nanocrystals are coated with a hydrophobic coating, because increasing the polarity of the growth medium by adding an alcohol causes the hydrophobic nanocrystals to precipitate from solution. Unfortunately, other hydrophobic materials in the growth medium can also precipitate, and in some cases, can be isolated in higher abundance than the desired nanocrystals. Extraction methods can be employed to separate the nanocrystals from the undesired hydrophobic material, but this usually reduces the yield and increases the cost of the product.

Multiple literature references describe the use of methanol to separate nanocrystals from growth media in this manner. These include Murray, C. B. et al., *J. Am. Chem. Soc.* 115: 8706 (1993); Hines, M. A. and Guyot-Sionnest, P., *J. Phys. Chem.* 100: 468 (1996); Peng, X. et al., *J. Am. Chem. Soc.* 119: 7019 (1997); and Dabbousi, B. O. et al., *J. Phys. Chem. B.* 101:9463 (1997).

In addition to the challenges of obtaining nanoparticles in high yields, nanoparticles can contain undesired excess oxidizable compounds on their surfaces. When nanoparticles are removed from their growth media by standard literature methods (precipitation with methanol), and then left to stand in solution, one frequently observes white solids that precipitate over time from the solution. Fluorescence measurements can be used to demonstrate that the precipitated solids are not nanocrystals. This demonstrates that the precipitation process using methanol may fail to remove certain impurities that are present in the complex media in which nanoparticles are typically formed and/or modified.

Accordingly, there is a need for improved methods suitable for isolation of nanoparticles from complex media, which ideally deliver high yields of desired product free of undesired impurities or contaminants, and which involve manipulations that are readily applied to large-scale nanoparticle preparation. Moreover, there is also a need for methods suitable for isolating or purifying nanocrystals made by known methods, which would ideally deliver high yields of clean and consistent nanoparticles, free of undesired impurities or contaminants, and which would involve manipulations that are readily applied to large-scale nanoparticle preparation.

SUMMARY

Methods are provided for isolating or purifying a nanoparticle made from a complex chemical mixture. The methods are applicable to a range of nanoparticle types and media. These methods can be applied to isolation of quantum dots and similar nanoparticles from the core growth media used to grow core nanocrystals or from the shell growth media used to produce a shell portion of a core-shell nanocrystal. They may also be applicable for isolation of aggregates of nanoparticles, such as those in US 2006/0172133, from a medium in which such aggregates are formed.

In one aspect, a method for isolating a nanoparticle is disclosed. A medium containing a nanoparticle is provided. The medium is acidified with a weak acid. An alcoholic solvent is added to induce the nanoparticle to precipitate from the medium. The precipicated nanoparticles are separated from the medium.

In another aspect, a method for isolating a solubilized hydrophobic nanoparticle from a growth medium, is disclosed. A weak acid compound is added to the growth medium. An alcoholic solvent is added to the growth medium to cause the nanoparticle to precipitate from the mixture of growth medium plus weak acid plus alcoholic solvent. The precipated nanoparticle is then separated from the mixture. In still another aspect, a method for purifying a population of nanoparticles, is disclosed. The population of nanoparticles is dissolved in a solvent to form a solution of nanoparticles. The solution is acidified. The population of nanoparticles is induced to precipitate from the solution.

In still yet another aspect, a method for increasing the yield of nanoparticles isolated from a growth medium, is disclosed. The growth medium is acidified with a weak acid. An alcoholic solvent is added to induce the nanoparticles to precipitate from the growth medium. The precipitated nanoparticles from the growth medium are separated. The separated nanoparticles are collected, wherein between about 2.0 nmol to about 3.0 nmol of separated nanoparticles are collected per 1 mL of growth medium.

These and other features, aspects, and embodiments are described below in the section entitled "Detailed Description."

BRIEF DESCRIPTION OF THE FIGURES

For a more complete understanding of the principles disclosed herein, and the advantages thereof, reference is now made to the following descriptions taken in conjunction with the accompanying drawings, in which:

FIG. 1 is a process flow diagram that depicts a method for isolating semiconductor nanocrystals from a complex medium, in accordance with one embodiment.

DETAILED DESCRIPTION

The embodiments described herein may be understood more readily by reference to the following detailed description of the embodiments and the Examples included herein. It should be understood that the terminology used herein is for the purpose of describing specific embodiments only and is not intended to be limiting. Furthermore, in the following detailed description of the embodiments, numerous specific details are set forth in order to provide a thorough understanding of them.

Unless defined otherwise, all technical and scientific terms used herein have the same meaning as is commonly understood by one of ordinary skill in the art.

Typically, nanocrystals, including core nanocrystals and core-shell nanocrystals, are grown in a complex growth medium containing high-boiling alkylphosphines, alkyl phosphine oxides, and alkylamines, as well as various salts, phosphonic acids, metals and/or chalcogens. The formation of a core nanocrystal or a core-shell nanocrystal requires heating complex mixture of such materials to fairly high temperatures, and inevitably produces some by-products that are difficult to separate from the desired nanocrystals. Because of the high temperature and complex reaction medium, the nature and amount of such by-products can vary with each batch of nanoparticles. However, few methods for separating these by-products from nanocrystals have been developed. Conventionally, the reaction mixture is simply cooled to around ambient temperature and diluted with methanol to form a precipitate that contains nanocrystals, and the nanocrystals produced by that method are used with little additional clean-up. While convenient to use, this process often can cause impurities to co-precipitate with the nanocrystals or to remain adsorbed on to the nanocrystals. In addition, this precipitation process can produce nanocrystals with non-uniform surface properties, such as variations in the density or distribution of ligands that are coordinated to the nanocrystals due to such methods. The various embodiments described herein can provide ways to remove some of the impurities that tend to co-precipitate with nanocrystals made and isolated by these conventional steps, and they also can provide a more consistent, high quality nanoparticle surface that can be especially suitable for further surface modifications and for use in highly sensitive systems like living cells or tissues.

The conventional reaction mixtures for growing a nanocrystal core and/or shell contain materials such as alkyl phosphine oxides and alkyl amines, and these tend to coordinate as a ligand coating on the nanocrystals formed. The alkyl portion of the alkyl phosphine oxides and/or alkyl amines thus tend to become the outer surface of such nanoparticles, since the phosphine oxide or amine portions are coordinated to the crystalline nanocrystal surfaces. Because the alkyl portions of these ligands can form the solvent-exposed outer layer of such nanocrystals, they can render the nanocrystals hydrophobic. The precipitation of such nanocrystals by added methanol relies upon the hydrophobicity of the nanocrystals; thus it may not precipitate nanocrystals that are not fully ligand-coated, and it often causes other hydrophobic residues, which are formed in the hot reaction mixture used to make the nanocrystal core and/or shell, to co-precipitate with the nanocrystals. Thus conventional isolation methods may provide lower yields and/or nonhomogeneous nanocrystal products. The embodiments described herein can address these and other inherent limitations of the conventional methods for nanocrystal isolation from the nanocrystal growth medium and surface preparations.

Furthermore, little appears to be known about methods for purifying nanocrystals and other nanoparticles once they are made. The embodiments described herein further provide methods to reduce the amounts of impurities admixed with or adsorbed onto nanocrystals made by methods that do not remove such impurities. The methods can also promote or increase uniformity of surface chemistry and characteristics among a plurality of like nanocrystals. The methods can also prepare the surfaces of nanocrystals for introduction of functional groups that are useful to link nanocrystals to targets such as molecules, cells or tissues.

Compositions and methods are described herein as "comprising" various components or steps, where 'comprising' is used to mean "including, but not limited to". However, the embodiments disclosed herein also include compositions and methods that "consist essentially of" or "consist of" the recited components and/or steps, where those terms respectively indicate that the composition or method being described is present to the exclusion of materials or methods that materially affect the recited composition or method, and that the composition or method being described is present to the substantial exclusion of other materials or steps other than those recited, except for ones that are typically present, such as impurities in the materials described, and which are present adventitiously.

It must also be noted that as used herein and in the appended claims, the singular forms "a", "an", and "the" include plural references unless the context clearly indicates otherwise. Thus, for example, reference to a "cell" is a reference to one or more cells and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments disclosed herein, exemplary suitable methods, devices, and materials are now described. Nothing mentioned herein is to be construed as an admission that the embodiments disclosed herein are not entitled to antedate such disclosure by virtue of prior invention.

"Optional" or "optionally" means that the subsequently described material, event or circumstance may or may not be present, and the disciption includes instances where the event occurs or material is present and instances where the event does not occur or where the material is not present.

The methods of disclosed herein relate to nanoparticles. Nanoparticles can include any solid particle that has a smallest dimension between about 1 and about 1000 nanometers in size. The properties of such molecules are often influenced by the particle size in a way that distinguishes them from larger particles of similar composition. Nanoparticles include, but are not limited to, nanocrystals and quantum dots. Within the scope of the embodiments described herein, nanoparticles can be between 2 and 500 nm in smallest dimension, or between 2 and 100 nm in smallest dimension, or between 2 and 50 nm in smallest dimension, or between about 2 and about 50 nm in smallest dimension.

The term nanocrystal can refer to an inorganic crystallite having a smallest dimension of from between about 1 nm and about 1000 nm, often between about between 2 and 500 nm in smallest dimension, or between 2 and 100 nm in smallest dimension, or between 2 and 50 nm, or between about 2 nm and about 50 nm, including but not limited to doped metal oxide, semiconductor, and doped semiconductor nanocrystals. Such nanocrystals and methods of producing them are known in the art. Nanocrystals can be uncoated 'core nanocrystals', which can be grown by methods that are known in the art. Alternatively, they can be 'core-shell' nanocrystals, which are core nanocrystals that have been coated with a passivating layer to form core-shell nanocrystals. Core-shell nanocrystals are known in the art and are typically prepared by a subsequent treatment of a core nanoparticle, to apply a surface treatment that enlarges the core nanocrystal and/or can improve its optical properties and often can also improve its stability and other surface characteristics. Nanocrystals of semiconductor materials such as those described herein can have unique optical characteristics that depend upon the size of the particles; such nanoparticles are commonly called quantum dots, which include both core nanocrystals and core-shell nanocrystals unless otherwise specified.

A semiconductor nanocrystal or quantum dot can be capable of emitting electromagnetic radiation upon excitation (i.e., the semiconductor nanocrystal is luminescent) and can include a core of one or more first semiconductor materials, which core can be optionally surrounded by a shell of a second semiconductor material. Often the coated nanocrystals associated with the embodiments disclosed herein are fluorescent nanocrystals. A semiconductor nanocrystal core surrounded by a semiconductor shell is referred to as a "core/shell" semiconductor nanocrystal. The surrounding "shell" material typically has a bandgap energy that can be larger than the bandgap energy of the core material and can be chosen to have an atomic spacing close to that of the core substrate. The core and/or shell can be a semiconductor material including, but not limited to, those of the Groups II-VI of the periodic table of elements, for example ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like, and those of Groups III-V of the periodic table of elements, such as GaN, GaP, GaAs, GaSb, InN, InP, InAs, InSb, and the like, and those of Group IV of the periodic table of elements (Ge, Si, and the like), as well as alloys or combinations or mixtures thereof.

Exemplary nanocrystals include but are limited to those described in U.S. Pat. Nos. 5,505,928; 5,990,479; 6,114,038; 6,207,229; 6,207,392; 6,251,303; 6,319,426; 6,444,143; 6,274,323; 6,306,610; 6,322,901; 6,326,144; 6,423,551; 6,699,723; 6,426,513; 6,500,622; 6,548,168; 6,576,291; 6,649,138; 6,815,064; 6,819,692; 6,821,337; 6,921,496; 7,138,098; 7,068,898; 7,079,241; and 7,108,915.

Nanocrystals purified by the disclosed methods can include regions that are crystalline, semicrystalline, amorphous, or any combination of these regions.

The nanocrystals can include at least some crystalline regions. The nanocrystals described herein can be individual nanocrystals or they can be aggregates of nanocrystals that fall within the size ranges described herein. Where aggregates are involved, the association between the coated or uncoated nanocrystals and/or coated or uncoated nanocrystals, or combination of these, in an aggregate or cluster can be through a variety of chemical, physical interactions, or a combination of these bonding interactions including but not limited to one or more of: covalent, ionic, hydrogen bonding, van der Waals, chemisorption, physisorption, and the like.

In some embodiments, the methods and resulting compositions provided herein relate to semiconductor nanocrystals, or "quantum dots." These are particles whose radii are smaller than the bulk exciton Bohr radius and constitute a class of materials intermediate between molecular and bulk forms of matter. Quantum confinement of both the electron and hole in at least one dimension can lead to an increase in the effective band gap of the material with decreasing crystallite size. Consequently, both the optical absorption and emission of semiconductor nanocrystals can shift to the blue (higher energies) as the size of the nanocrystals gets smaller.

Quantum dots can be composed of an inorganic, crystalline, semiconductive material and have unique photophysical, photochemical, and nonlinear optical properties arising from quantum size effects, and have therefore attracted a great deal of attention because of their potential applicability in a variety of contexts, e.g., in biological detection, light-to-chemical and/or light-to-electrical energy conversion schemes, catalysis, displays, and telecommunications. Quantum dots are characterized by size-dependent properties such as peak emission wavelength and quantum yield. These crystals generally vary in size from about 1 nm to 100 nm or from about 2 to about 50 nm, and may be variously composed of elements, alloys, or other compounds that provide the optical properties associated with quantum dots. The desirable properties of quantum dots differ depending on the field of use, but a "tunable" peak emission wavelength that depends principally on the size of the nanocrystal core, as well as chemical stability, and photochemical stability are generally characteristic of quantum dots.

For emission in the visible region of the electromagnetic spectrum, cadmium selenide (CdSe) materials are often used, largely because they provide quantum dots that exhibit size-dependent luminescence tunable throughout the visible wavelength range. That is, by changing the particle size of CdSe quantum dots, the emission can be varied throughout most of the visible wavelength region. Proper selection of synthetic conditions furthermore allows the preparation of exceptionally bright CdSe quantum dots, with luminescence efficiencies approaching unity (i.e. one emitted photon for every absorbed photon). Many other semiconductor materials that are known in the art can be used as the core for a quantum dot within the present embodiments.

A key innovation that significantly increased the utility of quantum dots is the addition of a discrete inorganic shell over the nanoparticle core. That is, decomposition pathways in many quantum dots can involve the formation of defects known as traps on the surfaces of its core. The key to ensuring and maintaining quantum dot emission is often to passivate these surface sites. Some have had reasonable success in passivating nanocrystal surfaces using organic capping materials such as an alkylamine, trioctylphosphine oxide (TOPO), oleic acid, octylphosphonic acid (OPA) or tetradecylphosphonic acid (TDPA) but these approaches have sometimes proven inadequate, decreasing luminescence intensity and resulting in nanocrystals that are insufficiently robust for particularly demanding applications including biological detection. The use of inorganic compounds as capping agents has proven to overcome some of these issues, providing that the material used is optically non-interfering, chemically stable, and lattice-matched to the underlying material. This last property is particularly important, since matching the lattices, i.e., minimizing the differences between the shell and core crystallographic structure, minimizes the likelihood of local defects, shell cracking, and formation of long-range defects.

Typically, a large band gap semiconducting material such as zinc sulfide (ZnS) will be used to epitaxially overcoat nanocrystal cores with a crystalline shell that matches the underlying lattice. In other words, crystalline growth of a core material such as CdSe can be halted and then growth of the nanoparticle can be continued using a related crystalline material such as ZnS to form a shell over the core. Suitable shell materials for a particular core nanocrystal are known in the art. While this shell material doesn't necessarily determine or strongly affect the size-tunable properties of the quantum dot, such as peak emission wavelength, such a passivating layer can have some effect on emission wavelengths, and it may have a substantial indirect impact on the quantum dot's special properties. For example, the brightness of core-shell materials often far exceeds that of nanoparticles that comprise core materials without a large band-gap outer shell layer. Additionally, resistance to chemical and photochemical decomposition is often markedly increased by this type of added layer.

As used herein, "weak acid" means an acid with a pKa less than seven and equal to or greater than zero. In certain embodiments, the weak acid has a pKa between about 2 and about 6, or between about 3 and about 5. In preferred embodiments, the weak acid has a pKa between about 2 and about 5.

'Alcoholic solvent' as used herein refers to a liquid containing at least one alcohol, where 'alcohol' refers to a hydroxyl-substituted hydrocarbon group. The alcoholic solvent can consist of or consist essentially of an alcohol or a mixture of two or more alcohols, or it can contain at least about 10% alcohol by volume admixed with another material that can be a non-alcohol. Typically where the alcoholic solvent is a mixture including a non-alcohol, the non-alcohol material can be miscible with the alcohol(s) used. Commonly the alcoholic solvent contains at least 10% alcohol by volume, or at least about 20% alcohol by volume, or at least about 40% alcohol by volume. The non-alcohol material can be a solvent, such as those commonly known in the art, or a mixture of such solvents; or it can be or can comprise other liquid materials that are not incompatible with the use intended, such as an alkyl phosphine, alkyl phosphine oxide, or alkylamine.

The hydrocarbon portion of the alcohols typically used in the present embodiments can be a C1-C10 hydrocarbon, which can include alkyl, aryl, and cycloalkyl molecular features, either alone or in combination. The hydrocarbon portion can be substituted with other substituents in addition to at least one hydroxyl group (—OH). Other substituents that may be present on the hydrocarbon portion of alcohols for use in the alcoholic solvents disclosed herein include additional hydroxyl groups, carboxylate groups, amino groups, halogens, CN, sulfonyl groups, and combinations thereof. Commonly used alcohols for the embodiments disclosed herein include C1-C6 alcohols, benzyl alcohol, and the like.

"Alkyl" as used in reference to alkyl phosphine, alkyl phosphine oxide, or alkylamine can refer to a hydrocarbon group having 1 to 20 carbon atoms, frequently between 4 and 15 carbon atoms, or between 6 and 12 carbon atoms, and which can be composed of straight chains, cyclics, branched chains, or mixtures of these. The alkyl phosphine, alkyl phosphine oxide, or alkylamine include embodiments having from one to three alkyl groups on each phosphorus or nitrogen atom. In preferred embodiments, the alkyl phosphine or alkyl phosphine oxide has three alkyl groups on P, and the alkyl amine(s) have one alkyl group on N. In some embodiments, the alkyl group can contain an oxygen atom in place of one carbon of a C4-C15 or a C6-C12 alkyl group, provided the oxygen atom is not attached to P or N of the alkyl phosphine, alkyl phosphine oxide, or alkylamine. In some embodiments, the alkyl can be substituted by 1-3 substituents selected from halo and $C_1$-$C_4$ alkoxy.

"Hydrophobic" as used herein refers to a surface property of a solid, or a bulk property of a liquid, where the solid or liquid can exhibit greater miscibility or solubility in a low-polarity medium than it does in a higher polarity medium. By way of example only, nanoparticles that are soluble in a hydrocarbon solvent such as decane and can be insoluble in an alcohol solvent such as methanol are hydrophobic.

"Hydrophilic" as used herein refers to a surface property of a solid, or a bulk property of a liquid, where the solid or liquid exhibits greater miscibility or solubility in a high-polarity medium than it does in a lower polarity medium. By way of example, a material that is more soluble in methanol than in a hydrocarbon solvent such as decane would be hydrophilic.

"Growth medium" as used herein refers to a mixture of reagents and/or solvents in which a nanoparticles is grown or in which a shell is grown on a nanoparticles. These growth media are well known in the art, and often include at least one metal, at least one chalcogenide, and one or more alkyl phosphines, alkyl phosphine oxides, or alkylamines.

FIG. 1 is a process flow diagram that depicts a method for isolating semiconductor nanocrystals from a complex medium, in accordance with one embodiment. The method can comprise providing at least one semiconductor nanocrystal in a growth medium (102), acidifying the growth medium (104), and adding an alcoholic solvent if necessary to precipitate the nanocrystal(s) (106). The method can further include separating and isolating the nanocrystal(s) from the mixture from which it precipitated (108), rinsing the nanocrystal with a solvent in which it is insoluble or sparingly soluble, and/or neutralizing residual acid mixed with the nanocrystal(s).

The methods can result in a higher yield of nanocrystals and/or improved homogeneity of nanocrystals, when compared to a counterpart method that does not involve acidification of the growth medium. The increase in yield is frequently at least about 1.5 fold, at least about 2 fold, at least about 2.5 fold, at least about 3 fold, at least about 3.5 fold, at least about 4 fold, or higher.

While not bound by theory, it is believed that the acidification step can enhance solubility of certain impurities typically present in growth media for nanocrystal core or shell preparation, thus reducing the amount of impurities that precipitate from the growth medium when the medium is modified to cause the nanoparticles to precipitate. As a result, the yield and/or purity of the nanocrystals obtained using the methods disclosed herein are improved over those obtained by diluting the growth medium with methanol, for example.

The nanoparticles useful in the methods described herein include semiconductor nanocrystals, which can generally be any semiconductor nanocrystal. In some embodiments, the semiconductor nanocrystal is a core nanocrystal. In other embodiments, the semiconductor nanocrystal can be a core-shell nanocrystal. Examples of materials for suitable semiconductor nanocrystals include MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$, $Ga_2Se_3$, $Ga_2Te_3$, $In_2S_3$, $In_2Se_3$, $In_2Te_3$, SnS, SnSe, SnTe, PbS, PbSe, PbTe, AlP, AlAs, AlSb, GaN, GaP, GaAs, GaSb, InN, InP, InAs, InSb, BP, Si, and Ge, and ternary and quaternary mixtures, compounds, and solid solutions thereof. In some embodiments, the nanoparticle is a CdSe core nanocrystal, and in some embodiments the nanoparticles is a core-shell nanocrystal having a ZnS shell and a CdSe core.

The nanoparticles can be isolated as ligand-coated materials that are hydrophobic due to the presence of ligands such as but not limited to alkyl phosphines, alkyl phosphine oxides, alkyl amines, and/or alkyl phosphonates The methods disclosed herein can further comprise contacting the medium with at least one alcoholic solvent. The alcoholic solvent can be added before the acidification step, after the acidification step, or concurrently with the acidification step. In some embodiments, the acidification step includes addition of an acid mixed with or dissolved in an alcoholic solvent. In preferred embodiments, an alcoholic solvent is added to the mixture after the acidification of the medium.

The alcoholic solvent can be a single alcohol or a mixture of multiple alcohols, or a combination of an alcohol with another material as described herein. Components of a combination can be either added sequentially or as a pre-made mixture, and an alcohol can be diluted with a non-alcohol or a solvent. The alcohol can generally be any alcohol having up to about 10 carbons and containing at least one free —OH group. Examples of suitable alcohols include methanol, ethanol, isopropanol (2-propanol), 1-propanol, n-butanol, n-pentanol, 1,2-ethanediol, 1,2-propanediol, 1,3-propanediol, 1,2,3-propanetriol (glycerol), benzyl alcohol, lactic acid, glycolic acid, tartaric acid or C1-C4 esters thereof, phenol, 1,2-benzenediol (pyrocatechol), 1,3-benzenediol, (resorcinol), and 1,4-benzenediol (hydroquinone).

In some embodiments, the methods can include acidifying the growth medium containing nanoparticles. In some embodiments, the methods include adjusting the acidity of a mixture containing nanoparticles by contacting the medium containing nanoparticles, such as a growth medium, with an acid. Often, the mixture is acidified by addition of an acid. The acid can be added alone (neat), or as a solution or suspension in a suitable carrier, usually comprising one or more solvents. Frequently, a carrier that is miscible with the medium containing nanoparticles is used.

The acid is frequently a weak acid, and can be an organic acid or an inorganic acid. Use of weak acid can protect the nanoparticles, since contact with a strong acid can etch the surface of nanoparticles: strong acids can introduce surface defects on quantum dot nanocrystals, which reduces their fluorescence yield and/or stability, or it can disrupt the hydrophobic ligation of a nanocrystal.

In some embodiments, the acid is a weak organic acid. In other embodiments, the acid is an inorganic acid such as a boronic acid or a phosphate salt having a suitable pKa. The methods can comprise contacting the growth medium with one acid, or more than one acid (such as 2, 3, 4, 5, 6, or more different acids). The acid can be a solid or a liquid. Where the acid is a solid, it can be diluted, suspended, or dissolved in a suitable solvent that is compatible with the acid, including an alcoholic solvent, or with another acid, or it can be used as a solid.

Examples of weak organic acids include, but are not limited to: acetic acid, citric acid, formic acid, propanoic acid, butanoic acid, fluoroacetic acid, bromoacetic acid, lactic acid, glycolic acid, propenoic acid, benzoic acid, oxalic acid, malonic acid, succinic acid, maleic acid, methylphosphonic acid, ethylphosphonic acid, isopropylphosphonic n-propylphosphonic acid, isobutylphosphonic acid, s-butylphosphonic acid, t-butylphosphonic acid, n-butylphosphonic acid, n-hexylphosphonic acid, phenylphosphonic acid, aromatic substituted phosphonic acid, aliphatic substituted phosphonic acid, aromatic substituted phosphinic acid, aliphatic substituted phosphinic acid, aliphatic substituted phosphates, and aromatic substituted phosphates. Salts of the phosphonic and phosphinic acids can also be used, provided their pKa is suitable. In addition, polymeric solids such as ion exchange resins having carboxylate, sulfonate, or phosphonate groups can be used, provided they have suitable acidity.

Examples of weak inorganic acids include, but are not limited to: $AgOH$, $HClO_2$, $H_2CO_3$, $HOCN$, $HNO_2$, $H_3PO_2$, $H_3PO_3$, $H_4P_2O_7$, $HSCN$, $H_2SeO_3$, $HSeO_4$, $H_2S_2O_4$, $HOCN$, $H_3PO_4$, $H4V_6O_{17}$.

The amount of acid used in these methods can be varied, but typically at least enough acid is used to prevent formation of waxy precipitates when an alcoholic solvent is added to a medium containing nanoparticles. This amount can readily be determined by simple empirical experimentation for any given medium. The amount can be adjusted according to the amount of a material that was introduced into the medium; for example, if the medium is a growth medium prepared using an alkylamine, the amount of acid used may be an amount that is at least equivalent to the amount of the alkylamine, e.g., at least one mole of acid can be introduced per mole of alkylamine that was used in the growth medium, or at least 2 moles of acid per mole of alkylamine used in the growth medium.

However, it is often convenient to use an amount of acid that is correlated with the amount of nanoparticles present in the growth medium. The amount of nanoparticles can be approximated from experience with the conditions used for a nanocrystal growth process, for example, or it may be determined from the amount of nanocrystal or nanoparticle introduced into a system where a shell is grown on a nanoparticle core that had been made before; or the amount of a fluorescent nanocrystal can be determined from a measurement of the fluorescence in the growth medium. Where an acid is added to the growth medium based on the amount of nanoparticles present, the amount of acid is typically at least 100 moles of acid per mole of nanoparticles present in the growth medium. The acid is often used at a molar ratio of acid to nanoparticle between about 2,000:1 and about 50,000,000:1. Examples of suitable molar ratios include, but are not limited to, about 50,000, about 100,000, about 200,000, about 300,000, about 400,000, about 500,000, about 1,000,000, about 2,000,000, about 5,000,000, or a range between any two of these values. It is noted that the precise amount of acid is typically not critical, thus 'about' as used in this context means plus or minus 20%; and amounts of acid described herein should be understood to have a precision of only one significant digit unless a more precise value is specified.

The acid used for acidification of a medium containing nanoparticles can be added to the mixture in pure form ("neat"), or as a solution or suspension in a solvent. Suitable solvents include those in which the acid can be dissolved or dispersed without substantial interaction of acid and solvent. Frequently the acid used is soluble in the solvent. Examples of suitable solvents include acetone, acetonitrile, benzene, butyl acetate, carbon tetrachloride, chloroform, cyclohexane, 1,2-dichloroethane, dichloromethane, dimethylformamide, dimethyl sulfoxide, dioxane, ethyl acetate, diethyl ether, heptane, methyl t-butyl ether, methyl ethyl ketone, diisopropyl ether, tetrahydrofuran, trichloroethylene, xylene, toluene, methanol, ethanol, and mixtures thereof. Preferably, the solvent is one that is miscible with the medium containing nanoparticles to be isolated.

In some embodiments, the medium containing nanoparticles to be isolated is homogeneous before acidification, and remains homogenous after acidification, i.e., acidification precedes precipitation of nanoparticles, and precipitation is induced in a separate, later step. In such embodiments, the nanoparticles are often caused to precipitate by addition of an alcoholic solvent. Where acidification involves use of an acid that is not fully soluble in the medium containing nanoparticles to be isolated, the resulting mixture may be heterogeneous and may have solids present after acidification. In such systems, the solids are typically separated from the mixture (acidified medium) before the subsequent step in which nanoparticles are caused to precipitate, to avoid precipitation of the nanoparticles at a stage where they would be mixed with other solids. However, this is not necessarily required, provided other means of separating such solids from the desired nanoparticles are available. Where applied to hydrophobic nanoparticles, acidic solids and many salts that may be present in the mixture, including ion exchange resins, can readily be separated by dissolving the hydrophobic nanoparticles in a hydrophobic, non-protic solvent and optionally washing out any acids or salts present by extraction methods well known to those of ordinary skill in the art.

The method of isolating precipitated nanoparticles can comprise filtering the nanoparticles to separate them from the mixture formed by acidification and/or addition of alcoholic solvent to the medium containing the nanoparticles, or centrifuging the mixture to cause the nanoparticles to separate out as a pellet.

The methods can further comprise washing the nanoparticles with a solvent such as an alcoholic solvent to rinse away residual components of the medium from the nanoparticles.

The methods can further comprise a step of neutralizing any residual acid present with the precipitated nanoparticles. By way of example only, neutralization can be performed by contacting the nanoparticles with a weakly basic solution or a buffer solution having a pH that is greater than 7. The nanoparticles can be in solid form for this step, or they can be dissolved in a hydrophobic solvent, such as a hydrocarbon solvent or a halogenated hydrocarbon solvent.

The methods can further comprise dissolving nanoparticles obtained by the foregoing methods in a hydrophobic solvent, such as a hydrocarbon solvent like decane, hexane, octane, etc., until the solids present are substantially dissolved, and removing undissolved material by filtration or centrifugation.

As alluded to above, methods for purifying nanocrystals made by conventional methods are also disclosed herein. The method can comprise providing at least one semiconductor nanocrystal in a hydrophobic solvent, and acidifying the solution, and optionally adding an alcoholic solvent if necessary to precipitate the nanocrystal(s). The method can further include one or more additional steps, such as isolating the nanocrystal(s) from the mixture from which it was precipitated, rinsing the nanocrystal with a solvent in which it is insoluble or sparingly soluble, and/or neutralizing residual acid mixed with the nanocrystal(s).

That is, a sample of previously made nanoparticles (with hydrophobic coatings) such as a sample of hydrophobic quantum dots, can be first dissolved in a hydrophobic solvent, such as a non-polar organic solvent. Typically the non-polar organic solvent is a hydrocarbon or a halogenated hydrocarbon solvent. Suitable examples of this solvent can include petroleum ether (which is a hydrocarbon fraction having a mixture of low-boiling alkanes, typically with boiling points between about 35° C. and 100° C., and often characterized by a boiling point range), hexanes, pentane, heptane, cyclohexane, octane, isooctane, and the like. Slightly more polar solvents, such as haloalkanes (dichloroethylene, chlorobutane, and the like) may also be used. Alkyl-substituted aromatic hydrocarbons such as toluene, chlorobenzene, xylene, mesitylene or isopropylbenzene may also be used. Mixtures of any of the above solvents can also be used. In a preferred embodiment, the non-polar organic solvent comprises at least one solvent selected from toluene, hexanes, cyclohexane, heptane, and xylene and xylenes. The non-polar organic solvent can be selected from toluene, heptane, chlorobenzene, and xylene.

The solution of nanoparticles can then be acidified by contacting it with a weak acid. The weak acid can be diluted with a suitable solvent. Acidification can cause the nanoparticles to precipitate as a purified sample of nanoparticles. Many examples of weak acids are discussed above, and can include weak organic acids such as formic acid, acetic acid, propionic acid, pivalic acid, butyric acid, benzoic acid, and the like. Acetic acid or another C1-C4 alkylcarboxylic acid is often used. The amount of the weak acid to be used can vary from about 1% of the volume of the non-polar organic solvent to about 50% of the volume of the organic acid. In many embodiments, the organic acid represents between 5% and 30% of the volume of the non-polar organic solvent, such as 10-25% by volume. The weak acid can be admixed with the non-polar organic solvent or it can be added to the nanoparticle dispersion separately.

Where the nanoparticles do not precipitate upon acidification, an alcoholic solvent can often be added to the acidified solution of nanoparticles to induce precipitation of the nanoparticles. Suitable alcoholic solvents include those described herein for nanoparticle isolation methods. In some embodiments, the alcoholic solvent includes methanol; optionally, it can also include a second $C_2$-$C_4$ alcohol or diol as a cosolvent, to enhance miscibility or solubility of the methanol, if used, with the non-polar organic solvent. Typically the alcoholic solvent is added after the nanoparticles have been dissolved or dispersed in the non-polar organic solvent, and the amount of the alcoholic solvent can be from about 20% of the volume of the non-polar organic solvent being used to about 500% of the volume of the non-polar organic solvent being used. The amount of the alcoholic solvent should be sufficient to induce the nanoparticles to precipitate from solution; these precipitated nanoparticles have a purified surface layer.

By way of example, only, the non-polar organic solvent can be used in an amount of about 0.1 ml to about 20 mL for every 1 nmol of nanoparticles used, and is typically about 1-5 mL per nmol of nanoparticles. The amount of the weak acid and the alcoholic solvent can then be determined according to the amount of the non-polar organic solvent used.

Once the non-polar organic solvent and the weak acid and the alcoholic solvent have been added, the mixture can be a suspension of nanoparticles in a homogeneous solution (i.e., the mixture of solvents present should form a single phase rather than existing as immiscible liquid phases). The nanoparticles can then be separated from the mixture of solvents, using conventional means such as filtration or centrifugation. Optionally, the process of dissolving/dispersing the nanoparticles in a non-polar organic solvent with a weak acid present, then adding an alcoholic solvent to precipitate the nanocrystals can be repeated a second time and optionally it can be repeated a third time.

Following this process, the nanoparticles that have been surface purified can optionally be rinsed with a solvent that does not dissolve the nanoparticles but can wash away residual solvents, etc. that may remain with the precipitated nanoparticles. For example, methanol or ethanol can be used to rinse the nanoparticles, which are largely insoluble in such polar solvents. Optionally, the nanoparticles can also be dissolved in a suitable solvent and washed with an aqueous buffer, or treated with a solid-phase buffering agent, to remove any residual acid present in or on the nanoparticles.

Progress of the surface purification process can be monitored by assessing the sedimentation rate for nanoparticles precipitating from solution as discussed herein. If desired, the sedimentation rate can be determined during or after the addition of the alcoholic solvent that is used to precipitate the nanoparticles from the non-polar organic solvent in which they are dissolved/dispersed for surface purification. Alternatively, progress can be monitored separately by dissolving an aliquot of nanoparticles in a non-polar solvent such as toluene or hexane, adding an alcoholic solvent that induces precipitation of the nanoparticles, and measuring the rate at which the nanoparticles precipitate or sediment. The rate of precipitation (or flocculation or sedimentation) can be determined by conventional methods known in the art such as methods for measuring turbidity. A slower sedimentation rate (increased time for complete sedimentation to occur) indicates that the surface of the nanoparticles is more pure than it had been. Example 15 herein describes an illustration of this method and demonstrates that nanoparticles purified by this method have a longer sedimentation time than nanoparticles purified by the same process but without adding the weak acid. This demonstrates that the weak acid has a distinct effect on the purification of the surface coating of a hydrophobic nanoparticle. Note that even a second cycle of dissolving and re-precipitating the nanoparticle in the absence of the weak acid does not achieve the level of purity (as correlated with the sedimentation rate) that is achieved by a first step of dissolving and re-precipitating the nanoparticle in the presence of a weak acid.

Once the nanoparticles precipitate, they can be separated from the mixture of hydrophobic solvent, weak acid and alcoholic solvent by methods known in the art for separating a solid from a liquid phase. Additional steps such as rinsing the nanoparticles, neutralizing residual acid, drying the nanoparticles, redissolving the nanoparticles in a solvent and filtering the solution, etc., can also be included in some embodiments.

The hydrophobic solvent can be a hydrocarbon solvent such as hexanes, octane, decane, and the like; alternatively, it can be an ether solvent such as diethyl ether, diisopropyl ether, MTBE, or dibutyl ether. The amount of solvent is readily ascertained by observing the dissolution of the nanoparticles. An excess of the hydrophobic solvent is often used for convenience. If turbidity or precipitates remain after the nanoparticles have dissolved, the solution can be filtered.

Once the nanoparticles are in solution, the solution can be acidified by contacting it with a weak acid. While not bound by theory, it is believed that the acidification step can enhance solubility of certain impurities typically present in growth media for nanocrystal core or shell preparation, thus allowing some of such impurities that precipitated from the growth medium along with the desired nanocrystals to be washed away from the nanocrystals by the methods described herein. Acidification may also reduce solubility of the nanocrystal in alcohol-containing media by increasing the hydrophobicity of the nanocrystals. This can occur if, for example, the nanocrystal has associated with it a polar amine group (from an alkylamine), which dissociates upon acidification. As a result, purity and/or homogeneity of the nanocrystals obtained using the methods of the invention can be improved over those obtained by conventional methods. In addition, the acidification may accelerate equilibration of ligands on the surface of nanocrystals in solution, which may allow more uniform distribution of ligands on the individual nanoparticles in a batch of nanoparticles.

In some embodiments, to further promote uniformity of the ligand coating on the nanocrystals, suitable ligands (e.g., TDPA, OPA, TOPO, etc.) may be added to the solution of nanocrystals in a hydrophobic solvent, and the mixture may optionally be allowed time to equilibrate so that other ligands can be partially removed by mass balance, driven by an excess of the desired ligand added to the mixture. For example, an alkyl phosphine oxide such as trioctyl phosphine oxide (TOPO) can be added to a solution of nanocrystals in a hydrophobic solvent, if TOPO was a primary ligand on the surface of the nanocrystals when they were produced. The added TOPO tends to replace other ligands that may be present on the nanocrystals, to enhance uniformity of the surfaces of the nanocrystals; acidification is believed to accelerate this replacement in some instances, e.g., where an alkylamine ligand is present on a nanocrystal. The ligand added to the solution is typically one that was used in the preparation of the nanocrystals. The amount of ligand to be added is often at least 1000 ligands per mole of nanocrystals, or at least one mole of ligand per mole of nanocrystals, and frequently is at least about 10 moles of ligand per mole of nanocrystals, or at least about 100 moles of ligand per mole of nanocrystals.

As discussed above, the solution of nanocrystals with added phosphine oxide or other ligand can be acidified before, during or after addition of the alcoholic solvent to further increase uniformity and/or purity of the nanocrystal product. In preferred embodiments, the solution of the nanocrystals in a hydrophobic solvent is acidified before the alcoholic solvent is added, or the acidification can occur concurrently with addition of the alcoholic solvent. In other embodiments, after the TOPO or other ligand has been added to a solution of nanocrystals in a hydrophobic solvent (e.g., hexanes, octane, decane), the solution is acidified with, e.g., acetic acid or another C1-C5 carboxylic acid in sufficient quantity to cause the nanocrystals to precipitate without requiring addition of the alcoholic solvent. A suitable acid to achieve this and selection of an appropriate amount of the acid can readily be accomplished by routine experimentation for any given solution of nanocrystals.

In one aspect, the embodiments described above provide methods for purifying the surface of a nanocrystal The following examples are included to demonstrate the various embodiments disclosed herein. It should be appreciated by those of skill in the art that the techniques disclosed in the examples which follow represent techniques discovered by the inventor(s) to function well in the practice of the various embodiments described herein where specific types of nanoparticles were being prepared, and thus can be considered to constitute preferred modes for its practice. However, those of skill in the art should, in light of the present disclosure, appreciate that many changes can be made in the specific embodiments which are disclosed and still obtain a like or similar result without departing from the scope of the embodiments disclosed. In short, the following experimental results are offered to illustrate but not to limit the embodiments described herein.

EXAMPLES

The examples below describe use of nanocrystals having a CdSe core and a ZnS shell, but the nanocrystals differ in their fluorescence emission wavelengths. The difference is due to difference in size of the core, or in the characteristics of the shell. Methods for making the 'quantum dots' in these examples are known in the art, and utilize conventional growth media for making both the core and the shell portions of the core-shell nanocrystals. The particular nanoparticles used in each example may differ from nanoparticles used in other examples, as indicated by different emission wavelengths; direct comparisons of results between or within these examples should only be made where the nanocrystals are comparable. The following Table summarizes the composition of the growth medium used for shell formation for each of several different nanocrystals.

TABLE 1

Growth Medium Components

| core-shell emission (nm) | ratio of the moles of growth medium component to the moles of quantum dots | | | |
|---|---|---|---|---|
| | decylamine | TDPA | TOP | TOPO |
| 525 | 18,000 | 6,000 | 24,000 | 35,000 |
| 565 | 43,000 | 8,000 | 76,000 | 53,000 |
| 655 | 138,000 | 24,000 | 164,000 | 85,000 |

The following Examples refer to a 'growth medium' in each case, and identify which type of nanocrystal was used by naming its characteristic emission band. Table 1 correlates the composition of the growth medium to the emission spectrum of the nanoparticle.

Example 1

General Procedure for Use of Weak Acid in Separating Nanocrystals from Growth Medium The following example was performed at a 1 mL scale for demonstration, but can be scaled up to larger volumes.

Semiconductor nanocrystals were prepared in a 1 mL volume growth medium. A volume of 1 mL of a solution of 20 percent acetic acid in toluene (v/v) was added. The mixture was thoroughly mixed until all or most of the cloudy material dissolved. Next, 1 mL of isopropanol and 1 mL of methanol was added and mixed. The mixture was centrifuged on a Fisher Scientific Model 228 bench top centrifuge for 5 minutes at 1380 g. The solids were retained. A volume of 1 mL hexane was added to the retained solids, and mixed until all or most of the solids dissolved. Any remaining undissolved solids were removed by filtration or centrifugation.

Example 2

Evaluation of Acetic Acid Concentration During Purification

To 1 mL of CdSe/ZnS core-shells nanocrystals with a peak emission wavelength of 655 nm in growth medium, 1 mL of a solution of 5, 10, 15, or 20 percent by volume glacial acetic acid in toluene was added (273,000 moles of acetic acid per mole of nanocrystals, 546,000 moles of acetic acid per mole of nanocrystals, 819,000 moles of acetic acid per mole of nanocrystals, and 1,092,000 moles of acetic acid per mole of nanocrystals respectively). This solution was thoroughly mixed until all or most of the cloudy material was dissolved. Next, 1 mL of a solution containing three parts methanol and one part isopropanol (by volume) was added and the resulting mixture was stirred. The mixture was centrifuged and solids were retained. To the solids, 3 mL of methanol was added and the mixture was stirred. The mixture was centrifuged and solids were retained. The methanol wash was repeated once more followed by the addition of 1 mL of hexane. This mixture was stirred until all or most of the solids dissolved. Undissolved solids were removed by filtration or centrifugation.

This example differs from the previous one in that several different amounts of acid were tested, and the recovered nanocrystals were washed twice with methanol, and that the precipitating alcohol was 3:1 methanol:isopropanol.

Example 3

Improvement in Yield Obtained by Using Acetic Acid

To 1 mL of CdSe/ZnS core-shells nanocrystals with a peak emission wavelength of 655 nm in growth medium, 1 mL of a solution of 10, 20, 30, 40, or 50 percent by volume glacial acetic acid in toluene was added (546,000 moles of acetic acid per mole of nanocrystals, 1,092,000 moles of acetic acid per mole of nanocrystals, 1,638,000 moles of acetic acid per mole of nanocrystals, 2,184,000 moles of acetic acid per mole of nanocrystals, and 2,730,000 moles of acetic acid per mole of nanocrystals respectively). This solution was thoroughly mixed until all or most of the cloudy material was dissolved. Next, 1 mL of a solution containing three parts methanol and one part isopropanol (by volume) was added and the resulting mixture was stirred. The mixture was centrifuged and solids were retained. To the solids, 3 mL of ethanol was added and the mixture was stirred. The mixture was centrifuged and solids were retained. The ethanol wash was repeated once more followed by the addition of 1 mL of hexane. This mixture was stirred until all or most of the solids dissolved. Undissolved solids were removed by filtration or centrifugation.

This example differs from previous ones in that the recovered nanocrystals were washed twice with ethanol instead of methanol.

The particle recovery for each concentration of acetic acid tested in this Example is given in Table 2.

TABLE 2

| acetic acid (% v/v) | Nanocrystal yield (nmol/mL) | Fold increase |
|---|---|---|
| 0 | 0.7 | — |
| 10 | 2.6 | 3.7 |
| 20 | 2.7 | 3.9 |
| 30 | 2.9 | 4.1 |
| 40 | 2.9 | 4.1 |
| 50 | 2.7 | 3.9 |

These results show that using acetic acid during the purification process dramatically improves the yield of nanocrystals. As demonstrated, use of about 500,000 moles of acid per mole of nanoparticles (the ratio corresponding to use of 10% acetic acid, see above) is sufficient to substantially improve the yield of nanocrystals, and use of larger amounts of acid provide only slight further increases in recovery of nanocrystals. The nanocrystal yield is calculated by measuring the absorbance of the purified nanocrystal solutions at a particular wavelength where only the purified nanoparticles absorb and dividing that absorbance value by the extinction coefficient of the purified nanocrystals at the same wavelength. In this example, the absorbance and extinction coefficient wavelength was 638 nm. The extinction coefficient was estimated to be 800,000 $M^{-1}cm^{-1}$.

Example 4

Use of Acetic Acid During Purification

To 1 mL of CdSe/ZnS core-shell nanocrystals with a peak emission wavelength of 655 nm in growth medium, 1 mL of a solution of 50 percent by volume glacial acetic acid in toluene was added (2,730,000 moles of acetic acid per mole of nanocrystals). The mixture was centrifuged and solids were retained. To the solids, 2 mL of ethanol was added and the mixture was stirred. The mixture was centrifuged and solids were retained. The ethanol wash was repeated once more followed by the addition of 1 mL of hexane. This mixture was stirred until all or most of the solids dissolved. Undissolved solids were removed by filtration or centrifugation.

No precipitation alcohol was used in this example. Addition of 50% acetic acid in toluene precipitates the nanocrystals without the use of alcohol. This demonstrates that use of an alcoholic solvent for precipitation of the nanoparticles is optional, and may not be necessary where a large amount of acid is used in the acidification step. However, this also depends on the relative volumes of the acidifying agent (acid plus solvent) and medium, and on the nature of the solvent used to dilute the acid, if any.

Example 5

Use of Acetic Acid During Purification

To 1 mL of CdSe/ZnS core-shells nanocrystals with a peak emission wavelength of 655 nm in growth medium, 2 mL of a solution of 10, 20, or 30 percent by volume glacial acetic acid in toluene was added (1,092,000 moles of acetic acid per mole of nanocrystals, 2,184,000 moles of acetic acid per mole of nanocrystals, 3,276,000 moles of acetic acid per mole of nanocrystals respectively). This solution was thoroughly mixed until all or most of the cloudy material was dissolved. Next, 1 mL of a solution containing three parts methanol to one part isopropanol (by volume) was added and the resulting mixture was stirred. The mixture was centrifuged and solids were retained. To the solids, 2 mL of ethanol was added and the mixture was stirred. The mixture was centrifuged and solids were retained. The ethanol wash was repeated once more followed by the addition of 1 mL of hexane. This mixture was stirred until all or most of the solids dissolved. Undissolved solids were removed by filtration or centrifugation.

This example differs from previous ones in that the ratio of acetic acid/toluene to nanocrystals was varied, while the amount of toluene relative to the amount of medium present was increased. The greater volume of toluene in these examples avoided precipitation of nanoparticles in the acidification step, and thus an alcoholic solvent was added to precipitate the nanocrystals.

Example 6

Use of Acetic Acid During Purification

To 1 mL of CdSe/ZnS core-shells nanocrystals with a peak emission wavelength of 655 nm in growth medium, 1.5 mL of a solution of 20 percent by volume glacial acetic acid in toluene was added (1,638,000 moles of acetic acid per mole of nanocrystals). This solution was thoroughly mixed until all or most of the cloudy material was dissolved. Next, 1 mL of a solution containing three parts methanol to one part isopropanol (by volume) was added and the resulting mixture was stirred. The mixture was centrifuged and solids were retained. To the solids, 3 mL of a solution containing three parts methanol to one part isopropanol (by volume) was added and the resulting mixture was stirred. The mixture was centrifuged and solids were retained. The alcohol wash with the same solution containing three parts methanol to one part isopropanol (by volume) was repeated once more, followed by the addition of 1 mL of hexane to the nanocrystals. This hexane mixture was stirred until all or most of the solids dissolved. Undissolved solids were removed by filtration or centrifugation.

This example differs from previous ones in the use of a different acetic acid/toluene to nanocrystal ratio, and the use of a different alcohol wash mixture.

Example 7

Use of Acetic Acid During Purification

To 1 mL of CdSe/ZnS core-shells nanocrystals with a peak emission wavelength of 655 nm in growth medium, 1 mL of a solution of 10 or 15 percent by volume glacial acetic acid in toluene was added (546,000 moles of acetic acid per mole of nanocrystals, and 819,000 moles of acetic acid per mole of nanocrystals respectively). This solution was thoroughly mixed until all or most of the cloudy material was dissolved. Next, 1 mL of a solution containing three parts methanol to one part isopropanol (by volume) was added and the resulting mixture was stirred. The mixture was centrifuged and solids were retained. To the solids, 1 mL of toluene and 1 mL of a solution of 10 or 15 percent by volume glacial acetic acid in toluene was added. This solution was thoroughly mixed until all or most of the cloudy material was dissolved. Next, 1 mL of a solution containing three parts methanol to one part isopropanol (by volume) was added and the resulting mixture was stirred. The mixture was centrifuged and solids were retained. To the solids, 3 mL of methanol was added and the mixture was stirred. The mixture was centrifuged and solids were retained. Next 3 mL of ethanol was added and the mixture was stirred. The mixture was centrifuged and the solids were retained. The ethanol wash was repeated once more followed by the addition of 1 mL of hexane. This mixture was stirred until all or most of the solids dissolved. Undissolved solids were removed by filtration or centrifugation.

This example differs from previous ones in the use of two acetic acid/toluene recovery steps, and the use of three alcohol washes.

Example 8

Use of Acetic Acid During Purification

To 1 mL of CdSe/ZnS core-shells nanocrystals with a peak emission wavelength of 525 nm in growth medium, 1 mL of a solution of 20 percent by volume glacial acetic acid in toluene was added (349,000 moles of acetic acid per mole of nanocrystals). This solution was thoroughly mixed until all or most of the cloudy material was dissolved. Next 1 mL of ethanol was added and mixed. The mixture was centrifuged and solids were retained. To the solids, 1 mL of a solution ethanol was added and mixed. The mixture was centrifuged and solids were retained. Ethanol wash was repeated and solids were retained. To the solids, 1 mL of hexane was added. The mixture was stirred until all or most of the solids were dissolved. Undissolved solids were removed by filtration or centrifugation. The particle recovery was 9.85 nanomoles per milliliter as compared to 6.8 nanomoles per milliliter for traditional recovery methods, using methanol to precipitate nanocrystals without acidification of the medium.

This example differs from previous ones in the use of a different semiconductor nanocrystal, and that all precipitations and washings were performed using ethanol.

Example 9

Use of Acetic Acid During Purification

To 1 mL of CdSe/ZnS core-shells nanocrystals with a peak emission wavelength of 565 nm in growth medium, 1 mL of a solution of 20 percent by volume glacial acetic acid in toluene was added (635,000 moles of acetic acid per mole of nanocrystals. This solution was thoroughly mixed until all or most of the cloudy material was dissolved. Next 1 mL of ethanol was added and mixed. The mixture was centrifuged and solids were retained. To the solids, 1 mL of a solution ethanol was added and mixed. The mixture was centrifuged and solids were retained. Ethanol wash was repeated and solids were retained. To the solids, 1 mL of hexane was added. The mixture was stirred until all or most of the solids were dissolved. Undissolved solids were removed by filtration or centrifugation. The particle recovery was 4.07 nanomoles per milliliter.

This example differs from previous ones in the use of a different semiconductor nanocrystal, and that all precipitations and washings were performed using ethanol.

Example 10

Use of Citric Acid During Purification

A 0.25 molar solution of citric acid in a solution containing 1 part methanol and three parts toluene was prepared.

To 1 mL of CdSe/ZnS core-shells nanocrystals with a peak emission wavelength of 655 nm in growth medium, 1 mL of the citric acid solution from above was added (78,000 moles of citric acid per mole of nanocrystals). This solution was thoroughly mixed until all or most of the cloudy material was dissolved. Next, 1 mL of a solution containing 1 part methanol and 1 part isopropanol (by volume) was added and mixed. The mixture was centrifuged and solids were retained. To the solids, 1 mL of hexane was added. This mixture was stirred until all or most of the solids dissolved. Undissolved solids were removed by filtration or centrifugation.

This example differs from previous ones in the use of citric acid instead of acetic acid.

Example 11

Use of Citric Acid During Purification

A 0.25 molar solution of citric acid in a solution containing 1 part methanol and three parts toluene was prepared.

To 1 mL of CdSe/ZnS core-shells nanocrystals with a peak emission wavelength of 655 nm in growth medium, 0.75 mL of the citric acid solution from above was added (59,000 moles of citric acid per mole of nanocrystals). This solution was thoroughly mixed until all or most of the cloudy material was dissolved. Next, 1 mL of a solution containing 1 part methanol and 1 part isopropanol (by volume) was added and mixed. The mixture was centrifuged and solids were retained. To the solids, 2 mL of a mixture containing 1 part methanol and 1 part isopropanol (by volume) was added and the mixture was stirred. The mixture was centrifuged and solids were retained. To the solids, 1 mL of hexane was added. This mixture was stirred until all or most of the solids dissolved. Undissolved solids were removed by filtration or centrifugation.

This example differs from previous one in the use of less citric acid, and more precipitation alcohol.

Example 12

Use of Citric Acid During Purification

A 1 molar solution of citric acid in ethanol was prepared.
To 1 mL of CdSe/ZnS core-shells nanocrystals with a peak emission wavelength of 525 nm in growth medium, 1 mL of the citric acid solution from above was added and thoroughly mixed (100,000 moles of citric acid per mole of nanocrystals). The mixture was centrifuged and solids were retained. To the solids, 1 mL of hexane was added. This mixture was stirred until all or most of the solids dissolved. Undissolved solids were removed by filtration or centrifugation. The hexanes solution was mixed with 2 mL of ethanol, and the mixture was stirred. The mixture was centrifuged and solids were retained. To the solids, 1 mL of ethanol was added and the mixture was stirred. The mixture was centrifuged and solids were retained. To the solids, 1 mL of chloroform was added. The particle recovery was 7.3 nanomoles per milliliter as compared to 6.8 nanomoles per milliliter for traditional recovery methods.

This example differs from previous ones in the use of a different semiconductor nanocrystal, and that the citric acid solution is made in ethanol instead of methanol/toluene. It demonstrates an improved recovery of nanoparticles relative to traditional methods.

Example 13

Use of Citric Acid During Purification

A 1 molar solution of citric acid in ethanol was prepared.

To 1 mL of CdSe/ZnS core-shells nanocrystals with a peak emission wavelength of 655 nm in growth medium, 4 mL of the citric acid solution from above was added and thoroughly mixed (1,250,000 moles of citric acid per mole of nanocrystals). The mixture was centrifuged and solids were retained. To the solids, 2 mL of hexane was added. This mixture was stirred until all or most of the solids dissolved. Undissolved solids were removed by filtration or centrifugation. The hexane solution was mixed with 2 mL of ethanol, and the mixture was stirred. The mixture was centrifuged and solids were retained. To the solids, 1 mL of chloroform was added.

This example differs from previous ones in the use of a higher ratio of citric acid solution to nanocrystals, the use of a different semiconductor nanocrystal, and fewer alcohol washes of the recovered nanocrystals.

Example 14

Reduction in Formation of Precipitates During Storage

Two decane solutions of CdSe/ZnS core-shells nanocrystals, with a peak emission wavelength of 525 nm, were prepared by different methods for comparison.

The first solution (A) was prepared by adding 1 mL of a solution of 20 percent acetic acid in toluene (v/v) to 1 mL of 525 nm nanocrystals in growth medium (349,000 moles of acetic acid per mole of nanocrystals). The mixture was thoroughly mixed until all or most of the cloudy material dissolved. Next, 1 mL of isopropanol and 1 mL of methanol was added and mixed. The mixture was centrifuged on a Fisher Scientific Model 228 bench top centrifuge for 5 minutes at 1380 g. The solids were retained. A volume of 1 mL hexane was added to the retained solids and mixed until all or most of the solids dissolved. Any remaining undissolved solids were removed by filtration or centrifugation. Next, 1 mL of isopropanol and 1 mL of methanol were added to the solution of nanocrystals in hexane and mixed. The mixture was centrifuged at 1380 g for 5 minutes. The solids were retained. A volume of 1 mL of decane was added and mixed until clear.

The second solution (B) was prepared by adding 1 mL of toluene to 1 mL of 525 nm nanocrystals in growth medium. The mixture was thoroughly mixed until all or most of the cloudy material dissolved. Next, 1 mL of isopropanol and 1 mL of methanol was added and mixed. The mixture was centrifuged on a Fisher Scientific Model 228 bench top centrifuge for 5 minutes at 1380 g. The solids were retained. A volume of 1 mL hexane was added to the retained solids, and mixed until all or most of the solids dissolved. Any remaining undissolved solids were removed by filtration or centrifugation. Next, 1 mL of isopropanol and 1 mL of methanol was added to the solution of nanocrystals in hexane and mixed. The mixture was centrifuged at 1380 g for 5 min. The solids were retained. A volume of 1 mL of decane was added and mixed until clear.

Solutions A and B were stored at 4° C. and analyzed for the presence of precipitates after 5, 11, 18, and 25 days. These precipitates are not nanocrystals as demonstrated by fluorescence measurements, but are in fact impurities from the synthesis that upon aging become insoluble and flocculate from solution as a mostly white solid. No precipitates were detected for solution A at any of the time points. Significant quantities of precipitates were detected at every time point for solution B. These results show that treatment of nanocrystals with a weak acid significantly decreases or eliminates certain impurities, leading to a product that contains less non-nanoparticle material, which is more suitable for prolonged storage in solution and may be more suitable for applications where impurities could be detrimental, such as for in vivo applications.

Example 15

Purification of the Surface Coating of Hydrophobic Nanoparticles

Two samples of CdSe/ZnS core-shells nanocrystals, with a peak emission wavelength of 605 nm, were treated by different methods as described below to demonstrate that use of a weak acid in a dissolution/re-precipitation process improves purification of the surface layer of nanoparticles.

The first sample (A) was prepared by adding 1 mL of toluene and 2 mL of a mixture of 75/25 methanol/isopropyl alcohol ("alcohol mixture") to 1 mL of 605 nm emitting core-shells in growth medium. This mixture was centrifuged for 5 min at 3000 rpm (equivalent to 1380 g). The supernatant was discarded. To the solids, 2 mL of toluene, and 2 mL of alcohol mixture were added. The mixture was centrifuged for 5 min. The supernatant was discarded. To the solids, 2 mL of methanol was added and the mixture was mixed. The mixture was centrifuged for 5 min and the supernatant was discarded. To the solids, 2 mL of methanol was added and the mixture was mixed. The mixture was centrifuged for 5 min and the supernatant was discarded. To the solids, 2 mL of hexane was added to disperse the nanocrystals. The hexane solution was centrifuged for 5 min to remove undispersed solid impurities. To the dispersion of nanoparticles in hexane, 2 mL of alcohol mixture was added. The mixture was centrifuged for a total of 5 min. The supernatant was discarded. To the solids, 2 mL of hexane was added to disperse the nanocrystals, which were flocculated again by the addition of 2 mL of alcohol solution and centrifuged for a total of 10 min. The turbidity of the mixture (indicating the presence of unsedimented clusters) was checked every 5 min.

A second sample (B) was processed similarly, except that a weak acid was added to the toluene used to dissolve the nanoparticles before they were re-precipitated. The second sample (B) of the same type of nanocrystals used for sample (A) was prepared by adding 1 mL of a mixture of 20% acetic acid in toluene ("AA mixture") and 2 mL of a mixture of 75/25 methanol/isopropyl alcohol ("alcohol mixture") to 1 mL of 605 nm emitting core-shells in growth medium. This mixture was centrifuged for 5 min at 3000 rpm (equivalent to 1380 g). The supernatant was discarded. To the solids, 1 mL of toluene, 1 mL of AA mixture, and 2 mL of alcohol mixture were added. The mixture was centrifuged for 5 min. The supernatant was discarded. To the solids, 2 mL of methanol was added and the mixture was mixed. The mixture was centrifuged for 5 min and the supernatant was discarded. To the solids, 2 mL of methanol was added and the mixture was mixed. The mixture was centrifuged for 5 min and the supernatant was discarded. To the solids, 2 mL of hexane was added to disperse the nanocrystals. The hexane solution was centrifuged for 5 min to remove undispersed solid impurities. To the dispersion of nanocrystals in hexane, 2 mL of alcohol mixture was added. The mixture was centrifuged for a total of 20 min but was checked for cloudiness every 5 min. The supernatant was discarded. To the solids, 2 mL of hexane was added to disperse the nanocrystals. The nanocrystals were flocculated again by the addition of 2 mL of alcohol solution and centrifuged for a total of 30 min Again the cloudiness (turbidity) was checked every 5 min.

The surface purities of the samples A and B were determined by recording the amount of time required for alcohol-induced flocculated clusters to form and sediment from hexane under mild centrifugation conditions (1380 g). The following table summarizes the results of this comparison study. Note that the purity of the surface of the nanoparticles is inversely proportional to the sedimentation rate, so the slower sedimentation rate produces a longer observed sedimentation time (see Table 3), which indicates a higher level of surface purity for the treated nanoparticles in Sample B. Table 3 indicates that two cycles of dissolving the nanoparticles in hexanes and precipitating them provided a lower quality surface than a single cycle performed the same way but with a weak acid added to each toluene dispersion of nanoparticles being purified.

TABLE 3

Comparison of the time for precipitation from hexane of alcohol flocculated nanoparticle samples.

| sample | time to sedimentation from hexane (minutes) | |
|---|---|---|
| | initial round | subsequent round |
| A (normal) | 5 | 10 |
| B (acid) | 20 | 30 |

While certain embodiments have been described above, it will be understood that the embodiments are described by way of example only. Those skilled in the art will appreciate that the same can be performed within a wide range of equivalent parameters, concentrations, and conditions without departing from the spirit and scope of the embodiments disclosed herein and without undue experimentation. Accordingly, the compositions/compounds, processes and/or methods described herein should only be limited in light of the claims that follow when taken in conjunction with the above description and accompanying drawings.

What is claimed is:

1. A method for isolating a nanoparticle, comprising:
providing a medium containing the nanoparticle;
acidifying the medium with a weak acid having a pKa less than seven and equal to or greater than zero;
adding an alcoholic solvent to the acidified medium induce the nanoparticle to precipitate from the medium; and
separating the precipitated nanoparticle from the medium.

2. The method of claim 1, wherein the nanoparticle provided in the medium is a core-shell nanocrystal.

3. The method of claim 1, wherein the nanoparticle provided in the medium is a quantum dot.

4. The method of claim 3, wherein the surface of the quantum dot is hydrophobic.

5. The method of claim 1, wherein the alcoholic solvent that is added comprises a C1-C4 alcohol.

6. The method of claim 1, wherein the weak acid is selected from the group consisting of acetic acid, formic acid, propionic acid, citric acid, pivalic acid, and butyric acid.

7. A method for isolating a solubilized hydrophobic nanoparticle from a growth medium, which comprises:
adding a weak acid having a pKa less than seven and equal to or greater than zero to the growth medium;
adding an alcoholic solvent to the acidified growth medium to cause the nanoparticle to precipitate from the mixture of growth medium plus weak acid plus alcoholic solvent; and
separating the precipitated nanoparticle from the mixture.

8. The method of claim 7, wherein the nanoparticle is a quantum dot.

9. The method of claim 7, wherein the weak acid is selected from the group consisting of acetic acid, formic acid, propionic acid, citric acid, pivalic acid, and butyric acid.

10. The method of claim 8, wherein the alcoholic solvent comprises at least one $C_1$-$C_4$ alcohol.

11. The method of claim 7, wherein the growth medium further comprises a phosphonic acid.

12. A method for isolating a solubilized hydrophobic nanoparticle from a growth medium, which comprises:
    adding a weak acid having a pKa less than seven and equal to or greater than zero to the growth medium, wherein the growth medium further comprises a phosphonic acid;
    adding an alcoholic solvent to the growth medium to cause the nanoparticle to precipitate from the mixture of growth medium plus weak acid plus alcoholic solvent; and
    separating the precipitated nanoparticle from the mixture.

13. A method for purifying a population of nanoparticles, comprising:
    dissolving the population of nanoparticles in a solvent to form a solution of nanoparticles;
    acidifying the solution with a weak acid having a pKa less than seven and equal to or greater than zero; and
    inducing the population of nanoparticles to precipitate from the solution by admixing the acidified solution with an alcoholic solvent to precipitate purified nanoparticles.

14. The method of claim 13, wherein the population of nanoparticles comprises nanoparticles that were precipitated from a growth medium by addition of methanol without acidifying the growth medium.

15. The method of claim 13, wherein the nanoparticles dissolved in the solvent are core-shell nanocrystals.

16. The method of claim 13, wherein the nanoparticles dissolved in the solvent are quantum dots.

17. The method of claim 16, wherein the surface of the quantum dots is hydrophobic.

18. The method of claim 13, wherein the alcoholic solvent that is added to the solution comprises a $C_1$-$C_4$ alcohol or a $C_2$-$C_4$ diol.

19. A method for increasing the yield of nanoparticles isolated from a growth medium, comprising:
    acidifying the growth medium with a weak acid having a pKa less than seven and equal to or greater than zero;
    adding an alcoholic solvent to the acidified growth medium to induce the nanoparticles to precipitate from the growth medium;
    separating the precipitated nanoparticles from the growth medium; and
    collecting the separated nanoparticles, wherein greater than about 1.0 nmol of separated nanoparticles are collected per 1 mL of growth medium.

20. The method of claim 19, wherein the nanoparticles are separated from the mixture of growth medium plus weak acid plus alcoholic solvent by centrifugation or filtration.

* * * * *